US010909552B2

(12) United States Patent
Diggs et al.

(10) Patent No.: US 10,909,552 B2
(45) Date of Patent: Feb. 2, 2021

(54) MOBILE APPLICATION ANALYTICS FRAMEWORK

(71) Applicant: INTERNATIONAL BUSINESS MACHINES CORPORATION, Armonk, NY (US)

(72) Inventors: Melanie R. Diggs, Mableton, GA (US); Terrence E. White, Cottage Grove, MN (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 1077 days.

(21) Appl. No.: 14/460,670

(22) Filed: Aug. 15, 2014

(65) Prior Publication Data

US 2016/0048848 A1  Feb. 18, 2016

(51) Int. Cl.
G06Q 30/02 (2012.01)
H04L 29/08 (2006.01)
G06F 16/9535 (2019.01)

(52) U.S. Cl.
CPC ..... *G06Q 30/0201* (2013.01); *G06F 16/9535* (2019.01); *H04L 67/22* (2013.01)

(58) Field of Classification Search
CPC .................. G06Q 30/0204; G06Q 30/0201
See application file for complete search history.

(56) References Cited

U.S. PATENT DOCUMENTS

| 8,233,888 B1 | 7/2012 | Koller et al. |
| 8,364,611 B2 | 1/2013 | Tendjoukian et al. |
| 8,631,473 B2 | 1/2014 | Bhatia et al. |
| 8,862,534 B1* | 10/2014 | Faratin ............ G06F 17/30616 706/45 |
| 9,626,685 B2* | 4/2017 | Martinez ................ G06Q 30/02 |
| 2009/0177644 A1* | 7/2009 | Martinez ................ G06Q 30/02 |
| 2013/0014146 A1 | 1/2013 | Bhatia et al. |
| 2013/0086063 A1* | 4/2013 | Chen ................. G06F 17/30595 707/736 |

(Continued)

FOREIGN PATENT DOCUMENTS

WO  2010019452  2/2010

OTHER PUBLICATIONS

Ning Chen et al, Ar-Miner: Mining Informative Reviews for Developers from Mobile App Marketplace, ICSE 2014: Proceedings of the 36th International Conference on Software Engineering May 2014 pp. 767-778 (Year: 2014).*

(Continued)

*Primary Examiner* — Andre D Boyce
(74) *Attorney, Agent, or Firm* — Brian M. Restauro; Andrew M. Calderon; Roberts Calderon Safran & Cole, P.C.

(57) ABSTRACT

Approaches are provided for collecting and distributing topical data. An approach includes collecting topical data from one or more mobile applications on a mobile device. The topical data describes areas of interest of a user based on a way in which the one or more mobile applications are used by the user. The approach further includes normalizing the collected topical data into a list of topics of interest for the user. The approach further includes tagging each topic of interest with a non-hierarchical keyword or term. The approach further includes sending the list of tagged topics of interest to one or more remote servers.

20 Claims, 6 Drawing Sheets

(56) References Cited

U.S. PATENT DOCUMENTS

| | | | | |
|---|---|---|---|---|
| 2013/0254231 A1* | 9/2013 | Decker | ............ | G06F 17/30545 |
| | | | | 707/770 |
| 2013/0258865 A1* | 10/2013 | Kovvali | ............... | H04W 24/10 |
| | | | | 370/241 |
| 2013/0325779 A1* | 12/2013 | Shahshahani | ............ | G06N 5/02 |
| | | | | 706/46 |
| 2014/0012799 A1* | 1/2014 | Eberlein | ............... | G06Q 10/10 |
| | | | | 707/603 |
| 2014/0032656 A1 | 1/2014 | Hyman et al. | | |
| 2015/0039432 A1* | 2/2015 | Rao | ................... | G06Q 30/0273 |
| | | | | 705/14.54 |
| 2015/0095471 A1* | 4/2015 | Singh | .................... | G06F 3/0482 |
| | | | | 709/221 |
| 2015/0143245 A1* | 5/2015 | Waldman | .............. | G06F 17/211 |
| | | | | 715/736 |
| 2016/0012818 A1* | 1/2016 | Faizakof | .......... | G06F 17/30705 |
| | | | | 704/245 |

OTHER PUBLICATIONS

Unknown.,"Mobile App Mash-up: Automatic View Creation using Data Mining"., An IP.com Prior Art Database Technical Disclosure, IPCOM000217030D, Apr. 27, 2012, 4 pages.

Kolb et al.,"Exploiting User Interest in Data-Driven Cloud-based Mobile Optimization", Department of Computer Science and Engineering, University of Minnesota, Twin Cities Minneapolis, MN, Apr. 2014, 8 pages.

\* cited by examiner

MOBILE APPLICATION ANALYTICS FRAMEWORK

FIELD OF THE INVENTION

The present invention generally relates to mobile application analytics, and more particularly, to systems and methods for collecting data indicative of interests of a mobile user based on a way in which various mobile applications are used by the mobile user.

BACKGROUND

The global use of mobile devices has exploded as many compelling and powerful mobile applications have made their way onto the market. Even though advances in hardware technology has contributed greatly to this expanded use, it is the mobile applications that drive consumer demand as many new and innovative mobile applications find distinctive ways to engage users. As users continue to rely heavily on their mobile devices to provide quick access to education, entertainment, communication, and the like, an opportunity is emerging that could provide valuable information regarding a user's general interest. This type of mobile application analytics can be used by vendors to personalize various offerings to individual users.

Mobile application analytics studies the behavior of mobile application users in a similar way to traditional software analytics. In a commercial context, mobile application analytics refers to the use of data collected as a mobile user interacts with a mobile application from a mobile device. Mobile application analytics helps to determine who uses the mobile application, on what devices, and where the users come from such that mobile application developers and marketers can determine which mobile applications work best for mobile traffic and which mobile marketing campaigns work best for the business, including mobile advertising, mobile search marketing, text campaigns, and desktop promotion of mobile applications and services.

SUMMARY

In a first aspect of the invention, a method is provided for that includes collecting topical data from one or more mobile applications on a mobile device. The topical data describes areas of interest of a user based on a way in which the one or more mobile applications are used by the user. The method further includes normalizing the collected topical data into a list of topics of interest for the user. The method further includes tagging each topic of interest with a non-hierarchical keyword or term. The method further includes sending the list of tagged topics of interest to one or more remote servers.

In another aspect of the invention, a computer program product is provided for collecting and distributing topical data. The computer program product includes a computer readable storage medium having program instructions embodied therewith. The computer readable storage medium is not a transitory signal per se, and the program instructions are readable by a computing device to cause the computing device to perform a method that includes receiving topics of interest collected by one or more mobile devices, wherein the topics of interest describes areas of interest of one or more users based on a way in which one or more mobile applications are used by the one or more users on the one or more mobile devices. The method further includes aggregating the topics of interest based on a non-hierarchical keyword or term attached to each topic of interest. The method further includes distributing the topics of interest to one or more analytics clients based at least on the non-hierarchical keyword or term attached to each topic of interest.

In a further aspect of the invention, a system is provided for that includes a CPU, a computer readable memory and a computer readable storage medium. The system further includes program instructions to collect topical data from one or more mobile applications on a mobile device, wherein the topical data describes areas of interest of a user based on a way in which the one or more mobile applications are used by the user. The system further includes program instructions to normalize the collected topical data into a list of topics of interest for the user. The system further includes program instructions to tag each topic of interest with a non-hierarchical keyword or term. The system further includes program instructions to send the list of tagged topics of interest to one or more remote servers. The program instructions are stored on the computer readable storage medium for execution by the CPU via the computer readable memory.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
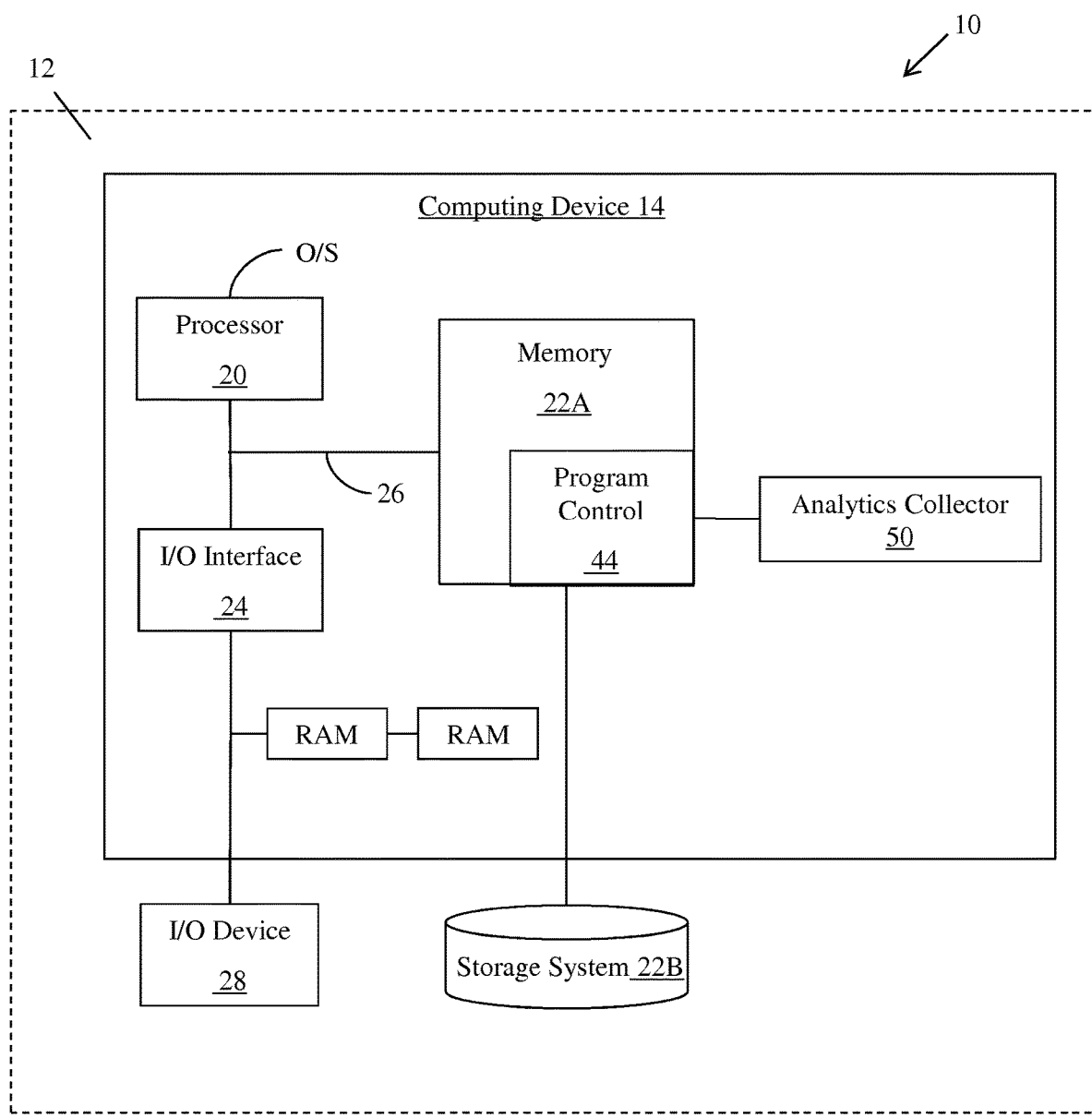
FIG. 1 shows an illustrative environment for implementing the steps in accordance with aspects of the invention.

The present invention generally relates to mobile application analytics, and more particularly, to systems and methods for collecting data indicative of interests of a mobile user based on a way in which various mobile applications are used by the mobile user. More specifically, implementations of the invention provide systems and methods for the collection of topical data describing key areas of interest of a mobile user based on the way in which various mobile applications are used by the mobile user, and the exposure of the topical data to one or more mobile application analytics clients. In embodiments, the data describing the key areas of interest of the mobile user is captured in the context of the mobile application, and normalized into a list of topics of interest that can be easily understood by systems and methods external to the mobile device. The present invention provides many advantages over conventional mobile application analytics, which do not collect data on the actual internal content of the mobile application. By way of one non-limiting illustrative example, the present invention provides revenue opportunities that are otherwise unrealized and improvements in mobile application or mobile marketing campaign's audience response.

In embodiments, a user of a mobile application can register or initiate a data collection protocol such that one or more mobile applications on the user's mobile device are activated to collect topical data (e.g., context sensitive topical information) based on the user's interaction with the one or more applications. Once the topical data is captured by the one or more mobile applications, the topical data may be sent to a central data collecting mobile application located on-board the user's mobile device. For example, the central data collecting mobile application may serve as a clearing house for all participating applications to send their topical data.

In embodiments, the central data collecting mobile application may be configured to normalize the topical data into a list of topics of interest, tag the topics of interest with a non-hierarchical keyword or term, and send the tagged topics of interest to one or more analytics servers. For example, the central data collecting mobile application may be configured to send the tagged topics of interest to one or more analytics servers such that the one or more analytics servers could receive tagged topics of interest from various mobile devices of various users. The one or more analytics servers may be configured to aggregate the tagged topics of interest and send the topics of interest to various analytics clients for use in their specific business domains. Advantageously and accordingly, the systems and methods of the present invention allow for the collection of topical data such that additional revenue opportunities may be realized and mobile applications or mobile marketing campaign's audience responses are improved.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 shows an illustrative environment 10 for managing the processes in accordance with the invention. To this extent, environment 10 includes a server 12 or other computing system that can perform the processes described herein. In particular, server 12 includes a computing device 14. The computing device 14 can be resident on a network infrastructure or computing device of a third party service provider (any of which is generally represented in FIG. 1).

The computing device 14 also includes a processor 20 (e.g., CPU), memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 14 is in communication with external I/O device/resource 28 and storage system 22B. For example, I/O device 28 can comprise any device that enables an individual to interact with computing device 14 (e.g., graphic user interface) or any device that enables computing device 14 to communicate with one or more other computing devices using any type of communications link. The external I/O device/resource 28 may be for example, a handheld device, PDA, handset, keyboard etc.

In general, processor 20 executes computer program code (e.g., program control 44), which can be stored in memory 22A and/or storage system 22B. Moreover, in accordance with aspects of the invention, program control 44 controls an analytics collector 50, which performs processes described herein. The analytics collector 50 can be implemented as one or more program code in program control 44 stored in memory 22A as separate or combined modules. Additionally, the analytics collector 50 may be implemented as separate dedicated processors or a single or several processors to provide the function of the analytics collector 50. While executing the computer program code, the processor 20 can read and/or write data to/from memory 22A, storage system 22B, and/or I/O interface 24. The program code executes the processes of the invention. The bus 26 provides a communications link between each of the components in computing device 14.

By way of example, the analytics collector 50 may be configured to provide the functionality of collecting and distributing topical data (e.g., context sensitive topical information) based on a user's interaction with one or more applications of a mobile device. In embodiments, the analytics collector 50 may be further configured to normalized topical data into a list of topics of interest and tag the topics of interest with a non-hierarchical keyword or term. In additional embodiments, the analytics collector 50 may be further configured to send the tagged topics of interest to a remote location for subsequent processing and distribution. In other embodiments, the analytics collector 50 may be further configured to aggregate the tagged topics of interest and send topics of interest to various analytics clients for use in their specific business domains.

The computing device 14 can comprise any general purpose computing article of manufacture capable of executing computer program code installed thereon (e.g., a personal computer, a mobile device, a server, etc.). However, it is understood that computing device 14 is only representative of various possible equivalent-computing devices that may perform the processes described herein. To this extent, in embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, server 12 is only illustrative of various types of computer infrastructures for implementing the invention. For example, in embodiments, server 12 comprises two or more computing devices (e.g., a server cluster) that communicate over any type of communications link, such as a network, a shared memory, or the like, to perform the process described herein. Further, while performing the processes described herein, one or more computing devices on server 12 can communicate with one or more other computing devices external to server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Figure 2:
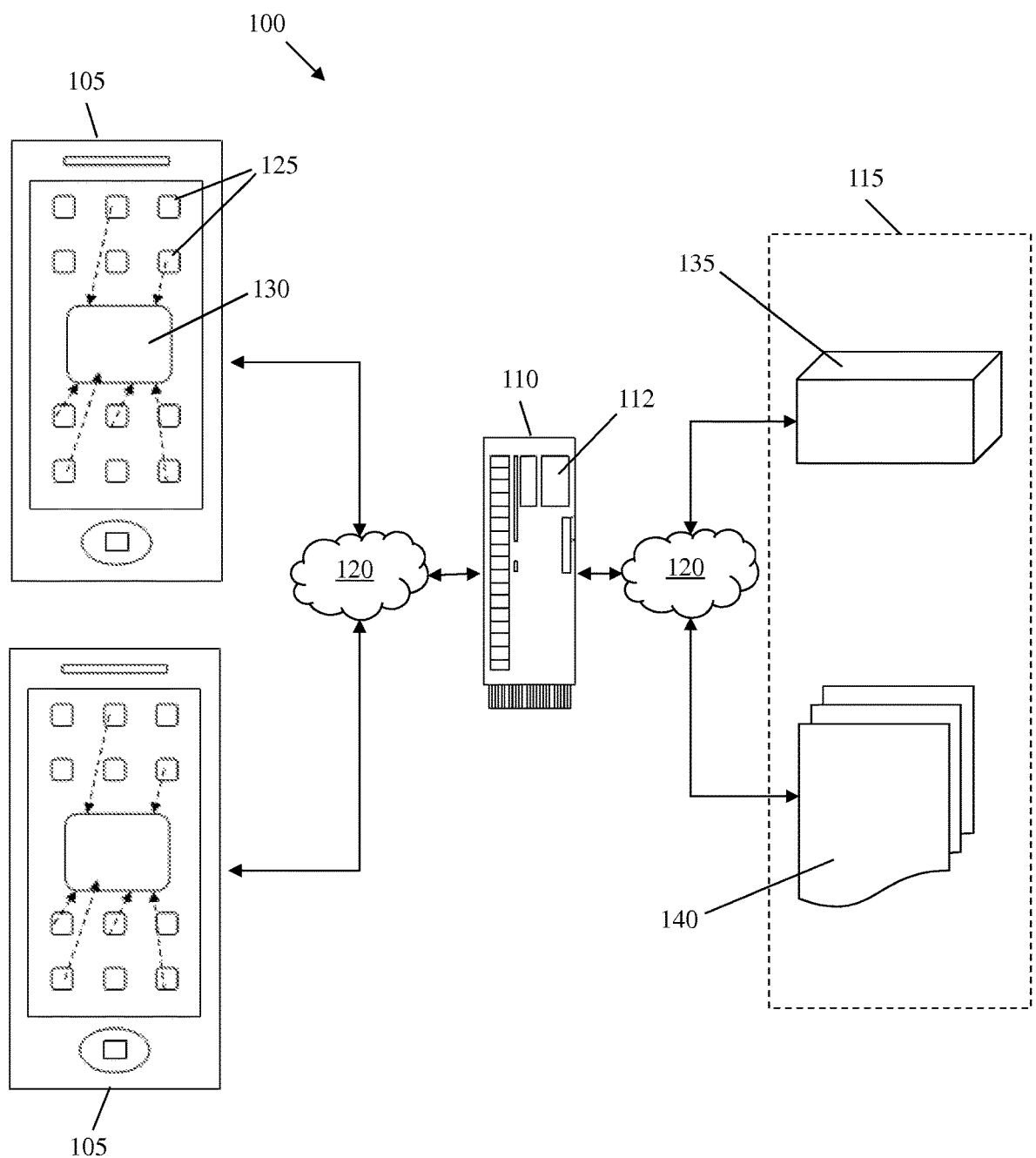
FIG. 2 shows a high level architecture for implementing processes in accordance with aspects of the invention.

FIG. 2 is a block diagram of a mobile application analytics system 100 according to embodiments of the present invention. The mobile application analytics system 100 can be used for the collection of topical data describing key areas of interest of a mobile user based on the way in which various mobile applications are used by the mobile user, and the exposure of the topical data to one or more mobile application analytics clients. As shown in FIG. 2, the mobile application analytics system 100 includes one or more mobile devices 105, one or more analytics servers 110, and one or more analytics clients 115, all operatively coupled via a network 120 (e.g., the Internet, a local area network, a wide area network and/or a wireless network).

The one or more mobile devices 105 may be, for example, a handheld computing device (e.g., computing device 14, as discussed with respect to FIG. 1) that includes one or more mobile applications 125. Each of the one or more mobile applications 125 may be a computer program designed to run on a handheld computing device and configured for a particular purpose, e.g., information retrieval, banking, location-based services, remote control services, retail purchases, viewing or listening to media, mobile games, etc. Each of the one or more mobile applications 125 may be enhanced to include additional program code configured to collect topical data (e.g., context sensitive topical information) based on a user's interaction with the one or more applications for the particular purpose.

In embodiments, the additional program code included within each of the one or more mobile applications may be configured to collect topical data that provides details on preferences, settings, and/or usage patterns in which a user has opted to utilize a particular application. For example, topical data collected from a sports related mobile application may detail the way in which a user has opted to customize the application to view of their favorite sports teams. A sports related mobile application may be configured to allow a user to personalize displayed content of the application by selecting one or more favorite sports teams. If a user selects a particular football team and a particular basketball team as his favorite teams, and spends the majority of their time viewing content related to the professional leagues in which the particular football and basketball team participate, then the topical data collected from the additional program code of the mobile application may include the name of the particular football team, the name of the particular basketball team, the name of the professional football team, and the name of the professional basketball league. Accordingly, as should be understood by those of skill in the art, several of the one or more mobile applications with the additional program code implemented on a mobile device would be capable of generating an extensive collection of topical data indicative of the interests of the user of the mobile device.

Each of the one or more mobile devices 105 may further comprise an analytics collector 130 (e.g., analytics collector 50, as discussed with respect to FIG. 1). In embodiments, the analytics collector 130 may be implemented as one or more program code such as a separate mobile application or as a portion of the operating system on each of the one or more mobile devices 105 as already described herein. In other embodiments, the analytics collector 130 may be implemented as separate dedicated processors or a single or several processors to provide the function of the analytics collector 130.

In embodiments, the analytics collector 130 may be configured to collect the topical data based on the user's interaction with the one or more applications 125 of a mobile device 105 and normalize the topical data into a list of topics of interest that can be easily understood by systems and methods external to mobile device 105. Data collection may run constantly, at regular intervals, or on a user-defined schedule. The analytics collector 130 may be further configured to tag the collected topics of interest with a non-hierarchical keyword or term, e.g., a mobile device and/or mobile user identification. In additional embodiments, the analytics collector 130 may be further configured to send the tagged topics of interest to the one or more analytics servers 110 for subsequent processing and distribution.

The one or more analytics servers 110 may be, for example, either the hardware (e.g., computing device 14, as discussed with respect to FIG. 1) and/or the software (e.g., a computer application or program) that is configured to collect and aggregate the topics of interest (e.g., context sensitive topical information) through the network 120. In embodiments, the one or more analytics servers 110 may comprise a data collector (e.g., analytics collector 50, as discussed with respect to FIG. 1) configured to collect different sets of topics of interest from the one or more mobile devices 105. Data collection may run constantly, at regular intervals, or on a user-defined schedule. Additionally, in embodiments, the data collector may be configured to support dynamic tuning for data collection, e.g., allow for adjustments in the scope of the data collection to suit various production environments, and may be extensible through its application programming interface (API).

In embodiments, the one or more analytics servers 110 may further comprise a data warehouse 112 including a database such as a relational database, that allows for data management of the topics of interest that are collected, e.g., by setting different retention periods for the topics of interest. In embodiments, the topics of interest may be saved in the data warehouse 112 based on the non-hierarchical keyword or term. For example, one or more program scripts may be run in the data warehouse 112 that are configured to create a schema that defines tables, columns, and relationships (e.g., relationships defined using the non-hierarchical keyword or term), and that populate the tables, columns, and relationships with the topics of interest upon collection.

In embodiments, the topics of interest collected by the data collector of the one or more analytics servers 110 and stored in the data warehouse 112 may be pushed to the one or more analytics clients 115 based on information retrieval preferences expressed in advance by the one or more analytics clients 115. In the context of the present invention it should be understood that pushing of the topics of interest refers to a request for the transmission of the topics of interest being initiated by the one or more analytics servers 110, in contrast to where the request for the transmission of the topics of interest is initiated by the one or more analytics clients 115 (e.g., pulling data). However, it should also be understood that the request for the transmission of the topics of interest may be initiated by the one or more analytics clients 115 without departing from the spirit and scope of the present invention.

The one or more analytics clients 115 may be one or more devices 135 of the users of the one or more mobile devices 105 or various collectors 140 of data. More specifically, in embodiments, the one or more analytics clients 115 may be one or more devices 135, which the user has registered or subscribed with the one or more analytics servers 110 to receive the topics of interest related to the user for purposes of enhancing use of the one or more devices 135. For example, the one or more devices 135 may be a set top box that is configured to receive the topics of interest associated with a mobile device or mobile user identification tag. In embodiments, the one or more devices 135 may be configured to record media programming based on the received topics of interest. For example, in the instance that the topics of interest includes the name of a particular football team, a name of the particular basketball team, a name of the professional football team, and a name of the professional basketball league, the one or more devices 135 may be configured to record media programming involving the particular football team, the particular basketball team, the professional football team, and the professional basketball league.

In additional or alternative embodiments, the one or more analytics clients 115 may be one or more collectors 140, which are registered or subscribed with the one or more analytics servers 110 to receive the topics of interest related to one or more users for purposes of enhancing mobile application development, product enhancement, targeted advertising, etc. For example, the one or more collectors 140 may be a mobile application developer and/or marketer that have subscribed to the one or more analytics clients 115 to receive the topics of interest related to one or more users.

In embodiments, a service provider could offer to provide the collected topics of interest to the one or more collectors 140 on the network 120. For example, the service provider can create, maintain, support, etc., a computer infrastructure, such as the one or more analytics servers 110 that push the collected topics of interest to the one or more collectors 140 based on registrations or subscriptions with the service provider. In return, the service provider can receive payment from the one or more collectors 140 under a subscription and/or fee agreement and/or the service provider can receive payment from the sale of advertising content to one or more third parties.

In additional or alternative embodiments, the one or more users of the one or more mobile devices 105 could offer to provide the topics of interest to the one or more collectors 140 on the network 120. For example, the one or more users may configure their one or more mobile applications 125 on the one or more mobile devices 105 such that the additional program code collects the topics of interest in accordance with registrations or subscriptions with the one or more collectors 140. In return, the one or more users can receive payment from the one or more collectors 140 under a subscription and/or fee agreement and/or the one or more users can receive payment from the sale of advertising content to one or more third parties.

Figure 3:
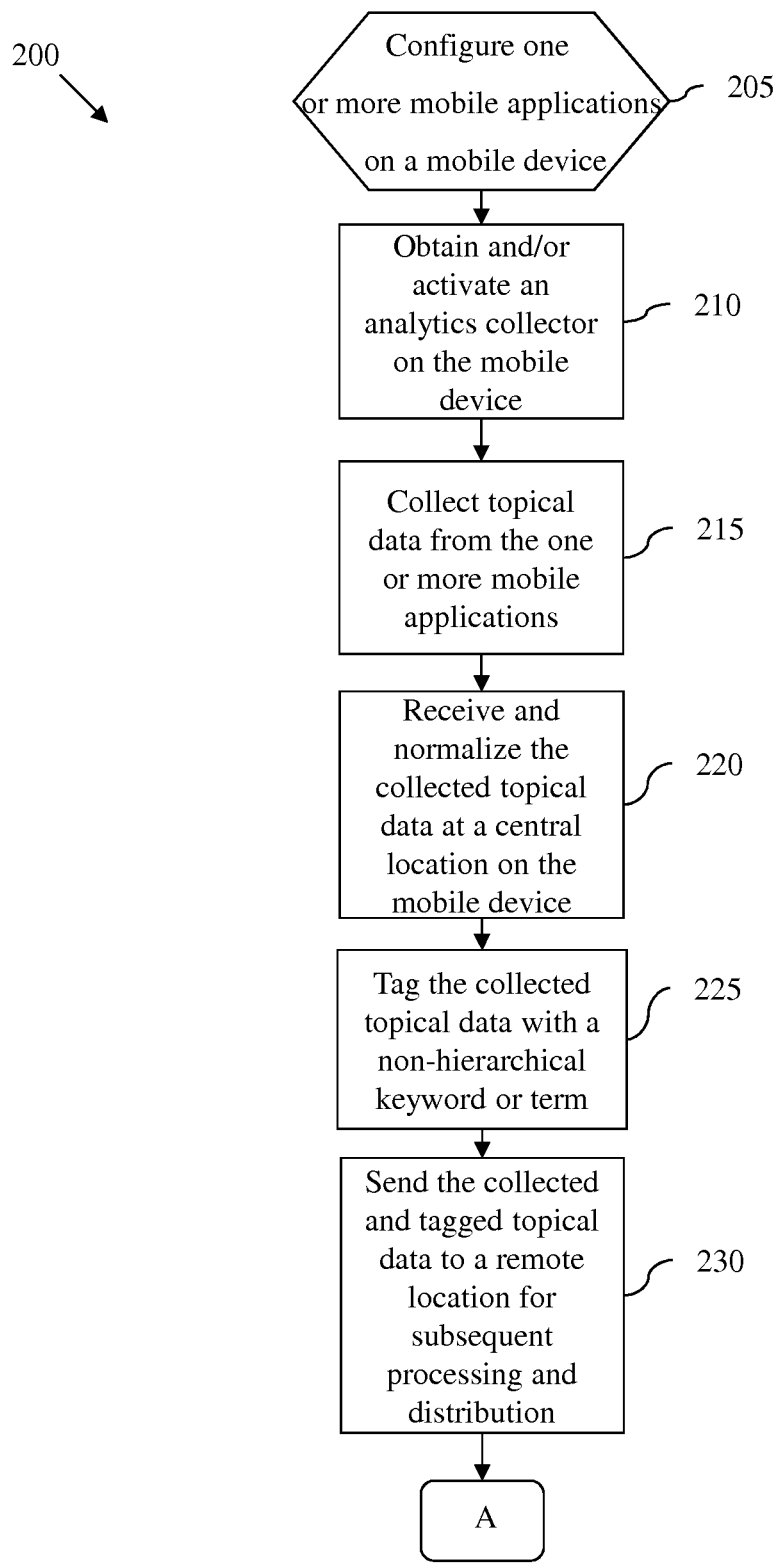
FIGS. 3 and 4 show exemplary flows in accordance with aspects of the invention.
Figure 4:
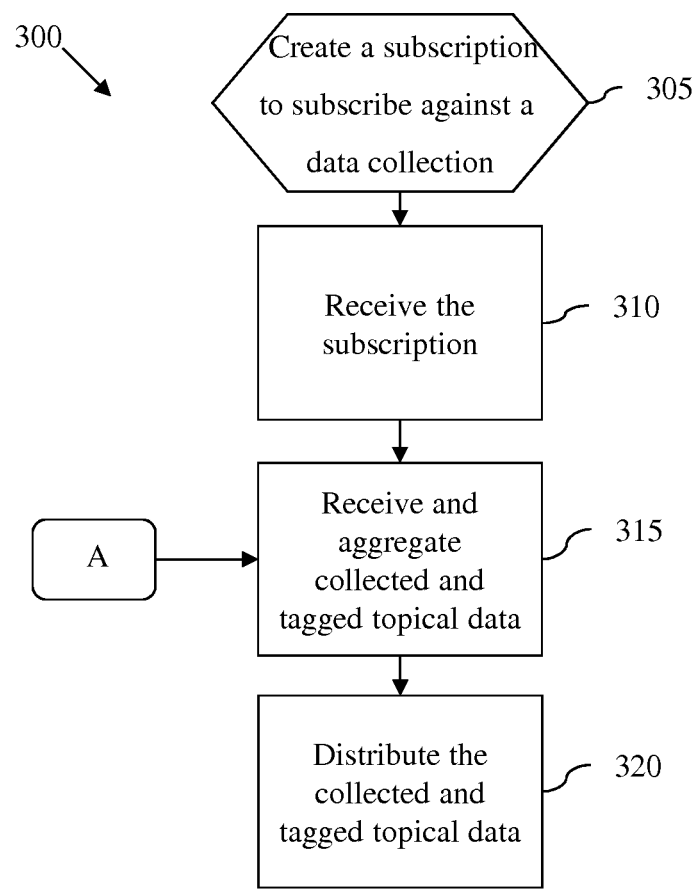

FIGS. 3 and 4 show exemplary flows for performing aspects of the present invention. The steps of FIGS. 3 and 4 may be implemented in the environments of FIGS. 1 and 2, for example. As noted above, the flowchart(s) illustrate the architecture, functionality, and operation of possible implementations of systems, methods, and computer program products as already described herein in accordance with the various embodiments of the present invention. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 3 is a flow diagram illustrating a process 200 for collecting topical data from one or more mobile applications in accordance with aspects of the present invention. At step 205, one or more mobile applications on a mobile device may be configured for operation. In embodiments, the configuration of the one or more a mobile applications (e.g., one or more mobile applications 125, FIG. 2) on the mobile device (e.g., computing device 14, FIG. 1; one or more mobile devices 105, FIG. 2) may include the user providing user preferences and/or settings for each of the one or more mobile applications such that an overall effect of the preferences and/or settings is a virtually comprehensive control of the user's interface with each of the one or more mobile applications for personal affect.

In embodiments, the configuration of the one or more a mobile applications may additionally or alternatively include the user providing data sharing permissions for each of the one or more mobile applications such that each of the one or more mobile applications are allowed to or prevented from accessing topical data. For example, the user may provide data sharing permissions such that each the one or more mobile applications are configured to access all, some, or none of topical data that is generated based on the user's interaction with each of the one or more mobile applications. In embodiments, the data sharing permissions may be provided in accordance with registrations or subscriptions. For example, the user may configure each of their one or more mobile applications on the mobile device such that each of the one or more mobile applications collects the topical data in accordance with registrations or subscriptions with one or more analytics clients.

At step 210, an analytics collector may be obtained and/or activated on the mobile device. In embodiments, the analytics collector (e.g., analytics collector 50 and 130, FIGS. 1 and 2) may be obtained from a third party, for example, purchasing and/or downloading a separate mobile application from an application vendor. In other embodiments, the analytics collector may not need to be obtained as the analytics collector may already be resident on the mobile device as part of prepackaged software (e.g., a preinstalled mobile application) included on the mobile device or as a portion of the operating system. In other embodiments, the analytics collector may not need to be obtained as the analytics collector may be implemented as hardware on the mobile device such as separate dedicated processors or a single or several processors.

Once the analytics collector is obtained or in the instance the analytics collector is already on the mobile device, the analytics collector may be activated. In embodiments, the analytics collector may be activated automatically in the normal course of turning on and using the mobile device. In additional or alternative embodiments, the analytics collector may be activated manually by a user, for example, a user opening the mobile application and configuring the mobile application to run in the background of the mobile device.

At step 215, topical data may be collected from the one or more mobile applications based on the preferences, settings, data sharing permissions, and/or usage patterns in which a user has opted to utilize each of the one or more mobile applications. In embodiments, the collection of the data from the one or more mobile applications may be performed by additional program code included within each of the one or more mobile applications. For example, the additional program code may be configured to collect the topical data that provides details or information on the preferences, settings, and/or usage patterns in which a user has opted to utilize each of the one or more mobile applications. Advantageously, aspects of the present invention allow for the collection of data (e.g., context sensitive topical information) on the actual internal content of each of the one or more mobile applications.

At step 220, the topical data collected from each of the one or more mobile applications may be received at a central location on the mobile device. In embodiments, the central location may be the analytics collector, which is configured to receive the topical data from each of the one or more mobile applications and normalize the topical data into a list of topics of interest that can be easily understood by systems and methods external to the mobile device. For example, the analytics collector may serve as a clearing house for all participating mobile applications on the mobile device to send their topical data. In aspects of the present invention, the normalization of the topical data into a list of topics of interest may comprise organizing fields and tables of a relational database to minimize redundancy.

In embodiments, the list of topics of interest collected and normalized by the one or more mobile applications may be pushed to the analytics collector. In the context of the present invention, it should be understood that pushing of the topics of interest refers to a request for the transmission of the topics of interest being initiated by each of the one or more applications, in contrast to where the request for the transmission of the topics of interest is initiated by the analytics collector. However, it should also be understood that the request for the transmission of the topics of interest may be initiated by the analytics collector without departing from the spirit and scope of the present invention.

At step 225, the collected and normalized topics of interest in the central location may be tagged with a non-hierarchical keyword or term. In embodiments, the analytics collector may be configured to assign a non-hierarchical keyword or term, for example, a mobile device and/or mobile user identification tag, to each piece or topic of interest. In embodiments, the non-hierarchical keyword or term may be considered metadata that describe the piece or topic of interest, for example in terms of marking ownership, and allows the piece or topic of interest to be aggregated based on identical or similar non-hierarchical keywords or terms, and found by browsing or searching. In embodiments, the non-hierarchical keyword or term may be provided in the form of alphanumeric strings, words, images, or other identifying marks.

At step 230, the collected and tagged topics of interest may be sent to a remote location for subsequent processing and distribution. In embodiments, the remote location may be one or more analytics servers (e.g., one or more analytics servers 110, FIG. 2), which are configured to receive and aggregate the topics of interest from the mobile device. In embodiments, the topics of interest received by the analytics collector may be pushed to the one or more analytics servers. In the context of the present invention it should be understood that pushing of the topics of interest refers to a request for the transmission of the topics of interest being initiated by the analytics collector, in contrast to where the request for the transmission of the topics of interest is initiated by the one or more analytics servers. However, it should also be understood that the request for the transmission of the topics of interest may be initiated by the one or more analytics servers without departing from the spirit and scope of the present invention.

FIG. 4 is a flow diagram illustrating a process 300 for collecting and distributing topical data from one or more mobile applications in accordance with embodiments of the present invention. At step 305, a registration or subscription to subscribe against a data collection may be created. In embodiments, one or more users (e.g., users of the one or more devices 135 and/or one or more collectors 140, FIG. 2) may utilize a web browser to create a registration or subscription with one or more analytic servers to subscribe against a service provider's data collections. For example, the one or more users may identify a subscription and select a class for the subscription, e.g., a class of subscription based on a fee schedule for subscribing to the service provider's data collections. Filters may then be added against selected attributes of the subscription. For example, the data collections on the one or more analytic servers may be first examined to determine attributes of the data collections (e.g., types of topical data collected including sports, products, services, political, music, travel, etc). Once the attributes are determined, filters in the form of operators and values may be applied against each attribute. Next, topical data delivery protocols may be selected for the subscription. For example, a user may select that the topics of interest be delivered constantly, at regular intervals, or on a user-defined schedule via a delivery channel such as enterprise JavaBeans (EJB), Simple Object Access Protocol (SOAP), or simple mail transfer protocol (SMTP).

At step 310, the registration or subscription to subscribe against a data collection may be received. In embodiments, the registration or subscription may be received at one or more analytics servers (e.g., one or more analytics servers 110, FIG. 2) from one or more users (e.g., users of the one or more devices 135 and/or one or more collectors 140, FIG. 2) and may subscribe against topics of interest collected from one or more mobile applications (as discussed with respect to process 200, FIG. 3).

At step 315, the collected and tagged topics of interest from each of the one or more mobile device may be received and aggregated at a remote location. In embodiments, the remote location may be one or more analytics servers (e.g., one or more analytics servers 110, FIG. 2), which are configured to receive and aggregate the topics of interest from one or more mobile devices from one or more users. For example, the one or more analytics servers may serve as a clearing house for all participating mobile devices to send their collected and tagged topics of interest. In embodiments, as described with respect to FIG. 3, the topics of interest received by the analytics collector may be pushed to the one or more analytics servers. However, it should also be understood that the topics of interest received by the analytics collector may be pulled from the analytics collector by the one or more analytics servers without departing from the spirit and scope of the present invention.

In embodiments, the aggregation of the data may comprise saving the topics of interest in a data warehouse based on the non-hierarchical keyword or term attached to each piece or topic of interest. For example, one or more program scripts may be run in the data warehouse that are configured to create a schema that defines tables, columns, and relationships (e.g., relationships defined using the non-hierarchical keyword or term), and that populate the tables, columns, and relationships with the topics of interest upon receipt.

At step 320, the received topics of interest may be distributed to one or more analytics clients based on the non-hierarchical keyword or term and/or the registration or subscriptions with the one or more analytics servers. In embodiments, the one or more analytics clients may be one or more electronic devices (e.g., one or more device 135, FIG. 2) of the users of the one or more mobile devices. More specifically, in embodiments, the one or more analytics clients may be one or more electronic devices (e.g., a personal computer, navigation system, set top box, gaming console, appliance, etc), which a user has registered or subscribed with the one or more analytics servers to receive topics of interest related to the user (e.g., identified by the non-hierarchical keyword or term) for purposes of enhancing use of the one or more electronic devices.

In additional or alternative embodiments, the one or more analytics clients may be one or more collectors (e.g., one or more collectors 140, FIG. 2), which are registered or subscribed with the one or more analytics servers to receive topics of interest related to one or more users (e.g., identified by the non-hierarchical keyword or term) for purposes of enhancing mobile application development, product enhancement, targeted advertising, etc. For example, the one or more collectors may be a mobile application developer and/or marketer that have subscribed to the one or more analytics clients to receive topics of interest related to one or more users.

In embodiments, the received topics of interest may be pushed to the one or more analytics clients based on the non-hierarchical keyword or term, information retrieval preferences and/or topical data delivery protocols selected in step 305 by the one or more analytics users. In the context of the present invention it should be understood that pushing of the topics of interest refers to a request for the transmission of the topics of interest being initiated by the one or more analytics servers, in contrast to where the request for the transmission of the topics of interest is initiated by the one or more analytics clients. However, it should also be understood that the request for the transmission of the topics of interest may be initiated by the one or more analytics clients without departing from the spirit and scope of the present invention.

Figure 5:
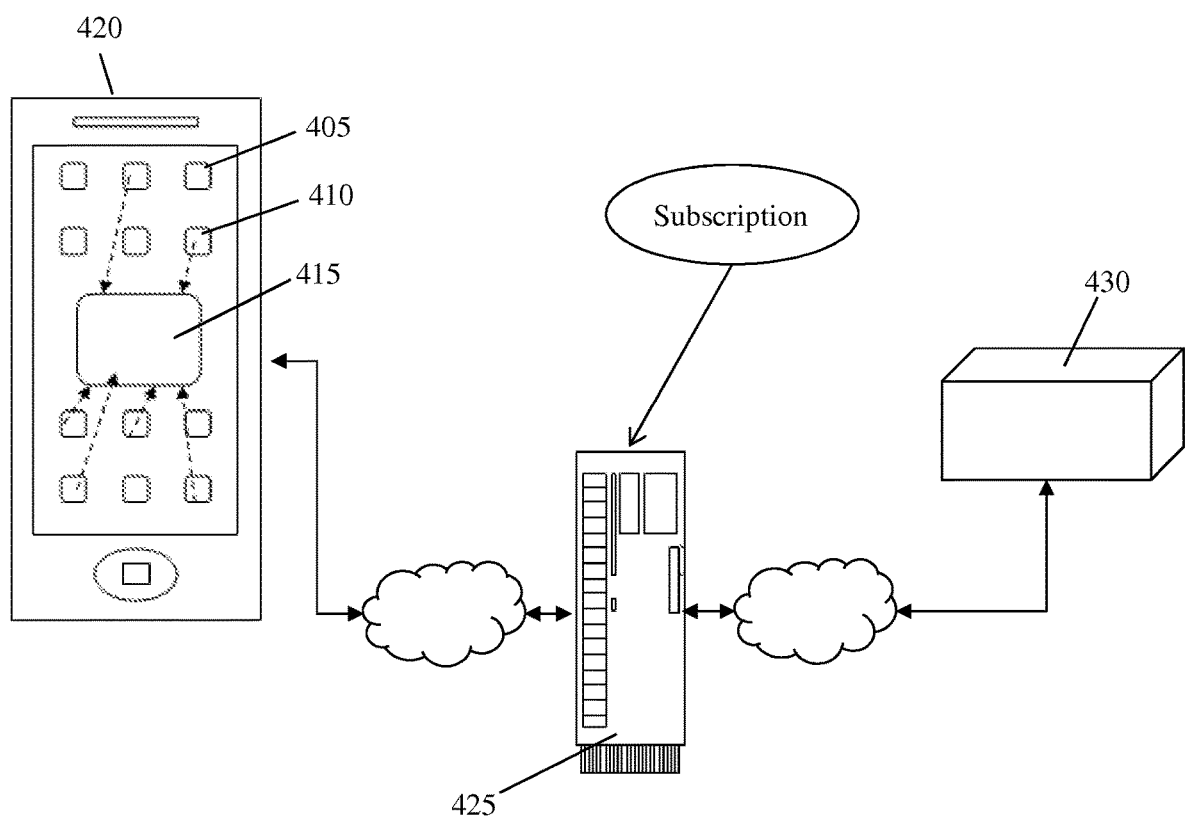
FIGS. 5 and 6 show visual representations of examples of operation in accordance with aspects of the invention.
Figure 6:
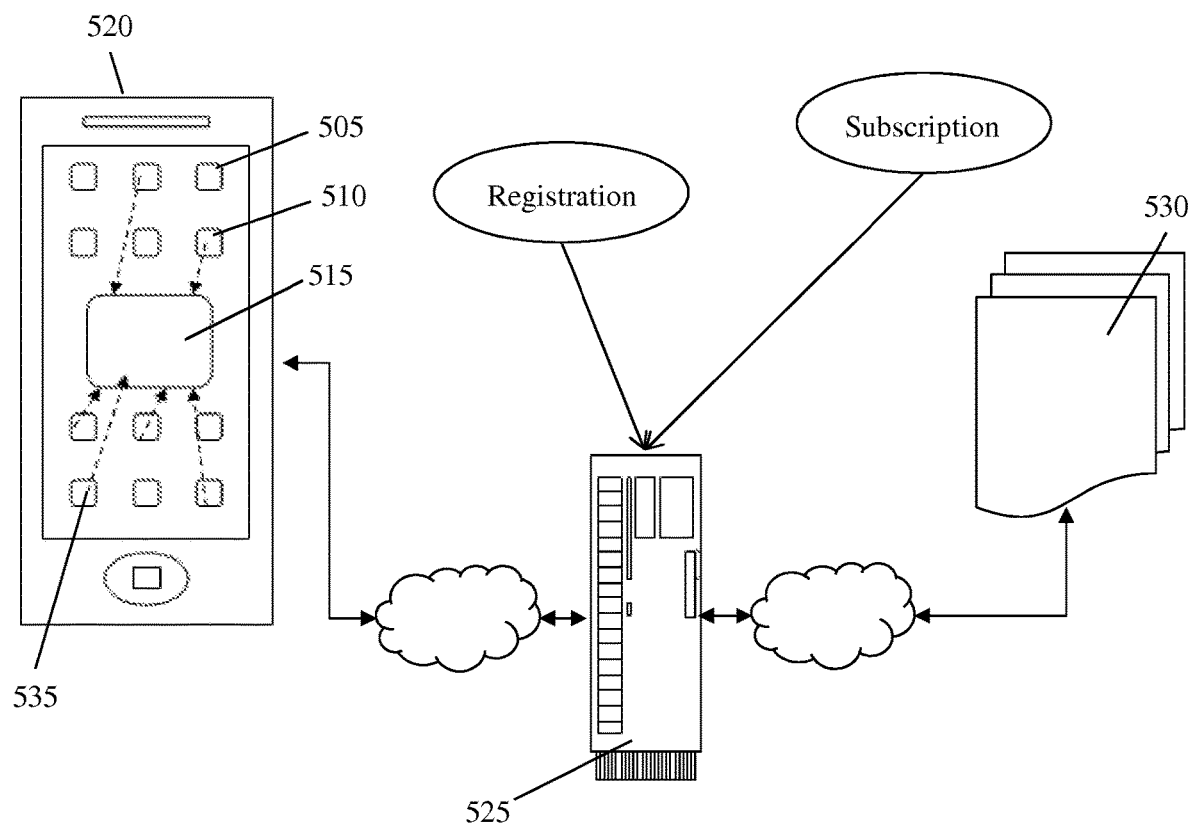

An example of operation is shown in FIGS. 5 and 6. These examples are not to be considered limiting features of the present invention, and are provided herein for illustrative purposes. As shown in FIG. 5, a user may configure a radio station application 405 and a sports application 410 to send topical data to an analytic collector 415 on their mobile device 420. The user may also configure a particular sports team as a favorite sports team on the sports application 405 and has been frequently listening to program covering a latest budget deal making its way through Congress via the radio station application 410. The two applications 405 and 410 may thus send topical data including the particular sports team, the league in which the particular sports team participates, new budget deals, Congress, and politics to the analytic collector 415. The analytics collector 415 may be configured to normalize the topical data into a list of topics of interest and send the topics of interest collected from the two applications 405 and 410 to a remote location such as one or more analytics servers 425.

Additionally, the user may create a subscription with the one or more analytics servers 425 to obtain collected topics of interest associated with the user identified by a mobile device and/or mobile user identification. The user may also configure their set top box 430 to receive the collected topics of interest associated with the mobile device and/or mobile user identification. The set top box 430 may be configured to record media programming involving the particular sports team and new budget deals in Congress.

In FIG. 6, a user may configure a radio station application 505 and a media programming application 510 to send topical data to an analytic collector 515 on their mobile device 520. The user may have created a new radio station on the radio station application 505 based on the latest music by a particular artist, and has watched a video on the media programming application 510 that covers new concerns from a government agency over antibacterial soaps. The two applications 505 and 510 may thus send topical data including the particular artist, government agency, and antibacterial soaps to the analytic collector 515. The analytics collector 515 may be configured to normalize the topical data into a list of topics of interest and send the topics of interest collected from the two applications 505 and 510 to a remote location such as one or more analytics servers 525.

Additionally, the user may register with the one or more analytics servers 425 to receive payments for exposing their topics of interest to third parties. A third party 530 may create a subscription with the one or more analytics servers 525 to obtain collected topics of interest associated with one or more mobile users. Overtime, the user may receive payments in their bank account associated with the exposure of their topics of interest to third parties, and may notice a new ad for the particular artist while listening to music on their mobile device 520 through a mobile application 535 published by the third party.

As should be understood, aspects of the present invention allow for the collection of topical data to be collected from within one or more mobile applications based on the preferences, settings, data sharing permissions, and/or usage patterns in which a user has opted to utilize each of the one or more mobile applications. More specifically, systems and methods of the present invention advantageously allow for controlling the collection of the topical data such that additional revenue opportunities may be realized and mobile applications or mobile marketing campaign's audience responses are improved.

In embodiments, the invention provides a method that performs the process of the invention on a subscription, advertising, and/or fee basis. That is, a service provider, such as a Solution Integrator, could offer to provide the data collection and distribution functionality on a network. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for collecting and distributing data on a network. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method implemented in a computer infrastructure having computer executable code tangibly embodied on a computer readable storage medium having programming instructions operable to:
   perform a mobile application analytics operation in an analytics collector by:
      providing data sharing permissions such that topical data collected from one or more mobile applications is based on at least one subscription of at least one topic of interest;
      collecting the topical data from the one or more mobile applications on a mobile device based on the at least one subscription of the at least one topic of interest, wherein the topical data describes the at least one topic of interest of a user based on a way in which the one or more mobile applications are used by the user, and wherein the topical data includes an identification tag identifying users of the one or more mobile applications and what type of devices are using the one or more mobile applications;
      collecting internal content data which comprises context sensitive information of each of the one or more mobile applications;
      normalizing the collected topical data into a list of topics of interest for the user by organizing fields and tables of a relational database to minimize redundancy of the collected topical data;
      tagging each topic of interest with a non-hierarchical keyword or term; and
      sending the list of tagged topics of interest and the collected internal content which comprises the context sensitive information to one or more remote servers,
   wherein the at least one subscription is generated through a web browser with the one or more remote servers to identify a class of subscription and delivered at predetermined intervals via a delivery channel based on selected topical data delivery protocols.

2. The method of claim 1, wherein the at least one topic of interest of the user is based on preferences, settings, and/or usage patterns in which the user has opted to utilize the one or more mobile applications.

3. The method of claim 1, wherein the non-hierarchical keyword or term is metadata that describes each topic of interest in terms of ownership.

4. The method of claim 3, wherein the non-hierarchical keyword or term is an identifier for the mobile device or the user.

5. The method of claim 1, wherein the sending the list of tagged topics of interest comprises pushing the list of tagged topics of interest to the one or more remote servers.

6. The method of claim 1, wherein the topical data is generated by the one or more mobile applications, and collected by a separate mobile application on the mobile device.

7. The method of claim 1, wherein a service provider at least one of creates, maintains, deploys and supports the computer infrastructure.

8. The method of claim 1, wherein steps of claim 1 are provided by a service provider on a subscription, advertising, and/or fee basis.

9. The method of claim 1, further comprising aggregating each topic of interest with the non-hierarchical keyword or term with an identical hierarchical keyword or term in the analytics collector found by browsing and searching the non-hierarchical keyword or term.

10. The method of claim 9, wherein the data sharing permissions are provided such that the one or more mobile applications are configured to access the topical data.

11. The method of claim 10, wherein each of the one or more mobile applications includes additional computer executable code configured to collect the topical data which is context sensitive topic information corresponding to the one or more mobile applications.

12. The method of claim 11, wherein the analytics collector is computer executable code which is included in an operating system of the mobile device.

13. The method of claim 1, further comprising receiving payments associated with the list of tagged topics of interests and the collected internal content data which comprises the context sensitive information being sent to the one or more remote servers.

14. The method of claim 1, further comprising receiving a new advertisement through the one or more mobile applications from the one or more remote servers after the list of tagged topics of interests and the collected internal content data which comprises the context sensitive information being sent to the one or more remote servers.

15. A system comprising:
    a CPU, a computer readable memory and a computer readable storage medium;
    program instructions to perform a mobile application analytics operation in an analytics collector comprising:
       program instructions to provide data sharing permissions such that topical data collected from one or more mobile applications is based on at least one subscription of at least one topic of interest;
       program instructions to collect the topical data from the one or more mobile applications on a mobile device based on the at least one subscription of the at least one topic of interest, wherein the topical data describes the at least one topic of interest of a user based on a way in which the one or more mobile applications are used by the user, and wherein the topical data includes an identification tag identifying users of the one or more mobile applications and what type of devices are using the one or more mobile applications;
       program instructions to collect internal content data which comprises context sensitive information of each of the one or more mobile applications;
       program instructions to normalize the collected topical data into a list of topics of interest for the user;
       program instructions to tag each topic of interest with a non-hierarchical keyword or term;
       program instructions to send the list of tagged topics of interest and the collected internal content data which comprises the context sensitive information to one or more remote servers; and
       program instructions to receive payments associated with the list of tagged topics of interests and the collected internal content data which comprises the context sensitive information being sent to the one or more remote servers,
    wherein the program instructions are stored on the computer readable storage medium for execution by the CPU via the computer readable memory,
    wherein the topical data is generated by the one or more mobile applications, and collected by a separate mobile application on the mobile device which operates as a clearinghouse for participating ones of the one or more mobile applications, and wherein the at least one subscription is generated through a web browser with the one or more remote servers to identify a class of subscription and delivered at predetermined intervals via a delivery channel based on selected topical data delivery protocols.

16. The system of claim 15, wherein the at least one topic of interest of the user is based on preferences, settings, and/or usage patterns in which the user has opted to utilize the one or more mobile applications.

17. The system of claim 15, wherein the non-hierarchical keyword or term is metadata that describes each topic of interest in terms of ownership.

18. The system of claim 15, wherein the non-hierarchical keyword or term is an identifier for the mobile device or the user.

19. The system of claim 15, wherein the normalizing the collected topical data includes organizing fields and tables of a relational database to minimize redundancy of the collected topical data.

20. The system of claim 15, wherein the sending the list of tagged topics of interest comprises pushing the list of tagged topics of interest to the one or more remote servers.

* * * * *